United States Patent [19]
Ahuja

[11] Patent Number: 5,388,022
[45] Date of Patent: * Feb. 7, 1995

[54] AUTO RESET CIRCUIT BREAKER

[76] Inventor: Om Ahuja, 9005 Longpoint, Apt. 11, Houston, Tex. 77055

[*] Notice: The portion of the term of this patent subsequent to Aug. 7, 2007 has been disclaimed.

[21] Appl. No.: 833,360

[22] Filed: Feb. 25, 1986

Related U.S. Application Data

[63] Continuation-in-part of Ser. No. 664,472, Oct. 24, 1984, abandoned.

[51] Int. Cl.⁶ .............................................. H02H 3/08
[52] U.S. Cl. ............................................ 361/94; 361/7; 361/91; 361/111
[58] Field of Search .......................... 361/5, 6, 7, 71, 74, 361/75, 78, 79, 83, 88, 89, 91, 93, 94, 100, 57, 111

[56]  References Cited

U.S. PATENT DOCUMENTS

| | | | |
|---|---|---|---|
| 3,369,154 | 2/1968 | Swain | 361/75 |
| 3,398,325 | 8/1968 | Shaffer | 361/100 |
| 3,573,550 | 4/1971 | Baker | 361/71 |
| 3,735,158 | 5/1973 | McDonald | 307/305 |
| 4,023,071 | 3/1977 | Fussell | 361/89 X |
| 4,363,064 | 12/1982 | Billings | 361/57 |
| 4,389,695 | 6/1983 | Carpenter, Jr. | 361/91 X |
| 4,420,787 | 12/1983 | Tibbits | 361/79 |
| 4,429,339 | 1/1984 | Jaeschke | 361/93 |
| 4,497,010 | 1/1985 | Funahashi | 361/93 |
| 4,544,983 | 10/1985 | Anderson et al. | 361/119 |

FOREIGN PATENT DOCUMENTS

| | | |
|---|---|---|
| 2819835 | 2/1979 | Germany . |
| 3204338 | 2/1982 | Germany . |
| 0782031 | 11/1980 | U.S.S.R. . |

Primary Examiner—A. D. Pellinen
Assistant Examiner—H. L. Williams
Attorney, Agent, or Firm—Alton W. Payne

[57] ABSTRACT

The specification discloses a solid state auto-reset circuit breaker intended for use in ac circuits, dc circuits and ac/dc circuits. A current sensing device is used to generate a voltage drop proportional to the current flowing through the device. When the voltage drop reaches a predetermined level, resulting from an over-current condition, it trips a control means that opens a solid state switch in the line. After a defined delay interval the circuit will automatically reset to close the solid state switch. If the over-current condition still exists, the control means will again open the solid state switch. This cycle is repeated at the delay interval until the over-current condition has subsided. Circuits are also disclosed which provide over-voltage protection, through detectors which trigger the control means when an over-voltage condition is detected. The application of the invention to lightning or surge protection is also disclosed, for single line and multiline environments.

15 Claims, 9 Drawing Sheets

AUTO RESET CIRCUIT BREAKER

This application is a continuation-in-part of my prior copending application U.S. Ser. No. 664,472 filed Oct. 24, 1984 now abandoned, entitled "Over-Current/Over-Voltage No-Blow Protection Device."

FIELD OF THE INVENTION

The present invention is an over-current and/or over-voltage protection device for use in an electrical circuit.

BACKGROUND OF THE INVENTION

Over-current protection is traditionally provided by fuses or circuit breakers which require thermal or electro-magnetic delay intervals for operation. Prior art over-voltage protectors generally are not capable of handling heavy current. Thus, a need exists for an over-current protector which provides instantaneous over-current protection, and which will augment or work in cooperation with an over-voltage detector to protect both the circuit and over-voltage device against high-current surges.

The present invention provides the following advantages over current state of the art devices;
  (a) it provides instantaneous protection at an electronic speed for the protected circuit, unlike the prior art devices which are inherently limited to thermal or electro magnetic delays;
  (b) it additionally provides over-voltage protection, providing isolation for the equipment or the protected line from the source until the over-voltage condition has subsided;
  (c) both the over-current and the over-voltage protection is fully automatic and does not need to be manually reset. The device periodically samples the source and load and continues to interrupt the primary line until the over-voltage or over-current condition has subsided.

The present invention is particularly applicable and useful for a wide variety of electrical applications, and may be provided as an AC circuit breaker, a DC circuit breaker, or an AC-DC circuit breaker.

The AC circuit version is particularly applicable to household and industrial application, particularly where large industrial motors or transformers are involved.

The DC circuit version is particularly applicable to automotive applications and industrial power supplies for computers and other voltage sensitive DC circuits.

The AC-DC circuits are particularly useful for the telecommunications industry, and power companies as surge protectors used to protect telecommunication lines and AC lines against lightning surges or other uncontrolled voltage and/or current-overloads.

SUMMARY OF THE INVENTION

The present invention provides an auto-reset circuit breaker for interrupting an electrical current in a line or circuit to be protected When the current or voltage exceeds a predetermined value. The circuit breaker includes at least one solid state silicon switch that is series mounted in the line of the circuit to be protected. This switch is responsive to a first control signal to open the switch to interrupt the current flowing therethrough. The circuit breaker includes a first means for measuring a variable voltage drop across at least one element series mounted in the line to be protected, which may be a resistor, a resistor network, or the switch itself. This first means generates a trip signal when the voltage drop across the series element and the electrical current in the line to be protected exceed predetermined values. A second means is provided that is responsive to the trip signal for providing a first control signal to the silicon switch, wherein the control signal is effective to open the switch when the electrical current has exceeded the predetermined value. A delay means is also provided that is responsive to the trip signal for enabling the second means for a delay interval, whereby the electrical current is periodically reestablished and then broken at each delay interval until the electrical current and the trip voltage drop below their predetermined values.

The second means of the present invention may be programmed to select any one of a plurality of predetermined values for the trip signal voltage. In addition, the series element in the line to be protected may comprise a resistor network having a plurality of values to provide surge current protection at a variety of predetermined levels.

The auto-reset circuit breaker of the present invention, may also be rendered in digital form with an analog to digital converter measuring the voltage across the solid state switch and converting the analog voltage to digital form. A comparator is then provided to trigger the solid state switch or the second control means when a predetermined voltage drop has been exceeded.

The solid state switch of the present invention may be a triac, an SCR, or a pair of complimentary (p & n or n & n) field effect transistors.

The auto-reset circuit breaker of the present invention may also be used in combination with a high voltage and current primary protection device which is mounted between the line to be protected and earthground, with the primary protection device connected in front of the solid state switch. A transient voltage suppressor may also be mounted between each of the line to be protected and ground with the transient suppressor connected behind the solid state switch. In addition, the auto-reset circuit breaker of the present invention may be connected in a multi-line environment to provide over-current protection between each of the lines and between each of the lines and ground.

BRIEF DESCRIPTION OF THE DRAWINGS

FIG. 1(a) illustrates an over-current condition on line 12, 14.

FIG. 1(b) illustrates the signal present at the input to the solid state switch illustrated in FIG. 1.

FIG. 1(c) illustrates the output signal at 25 of the control circuit illustrated in FIG. 1.

FIG. 1(d) illustrates the output of the time delay circuit illustrated in FIG. 1.

DETAILED DESCRIPTION OF THE INVENTION

Figure 1:
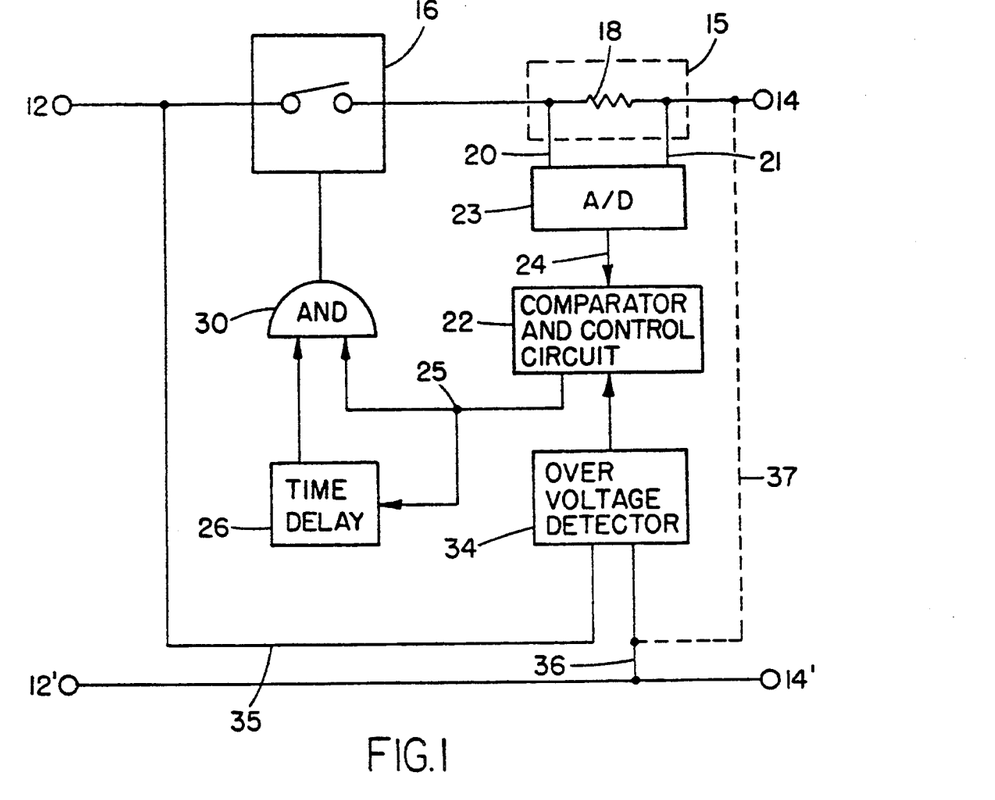
FIG. 1 is block diagram illustrating the functional relationship of the various components of the present invention, and the components to be used if the invention is to be rendered in digital form.

The over-current/over-voltage auto-reset circuit breaker of the present invention is illustrated in the Block diagram of FIG. 1. The auto-reset circuit breaker 10 is normally connected in series to an electrical circuit 12, 14 to be protected, in place of, or in addition to an ordinary fuse or circuit breaker. The return leg of the circuit in FIG. 1 is illustrated as 12', 14'. The present invention may be used in a conventional 2 line AC or DC circuit as illustrated, or may be installed in a DC environment wherein 12', 14' is a chassis ground Other applications of the circuit will be hereafter described, and will be apparent to those skilled in the art.

The auto-reset device 10 includes a solid state switch 16 which is biased to be normally closed. A current detection means 15 consisting of a series resistor 18 (also known as a shunt resistor), generates a voltage drop across it, which is proportional to the current flowing therethrough on line 12, 14. This voltage drop is proportional to the value of its resistance. In normal operation, the resistor 18 has an extremely low value, which may be on the order of 0.5 ohms for a 110–220 V AC circuit. This voltage drop may then be converted to a digital value by the analog to digital converter 23. When the current through the line 12, 14 and resistor 18 exceeds the designed current, the voltage drop across 20,21 and the digital value at 24, will trigger the control circuit 22. Control circuit 22 is a comparator which will compare the incoming signal of 24 with a preset value. When the trip signal voltage at 24 exceeds that value, the comparator control circuit will produce a low going first control signal at 25 (illustrated at FIG. 1(c)) which opens the solid state switch 16 through AND gate 30.

Simultaneously, the first low input signal at 25 also initiates a time delay means 26, which also goes low as indicated in FIG. 1(d) to hold the AND gate 30 in a low position until the end of the delay period. Switch 16 is thereby held open through the entire delay period as indicated at 1(b). At the end of the delay period, the output of 30 is high, and if the first control signal is also high at 25, the AND gate will be reset to close switch 16. If the first control signal at 25 is still low, due to a continuing short or other overcurrent condition on the line, the time delay 26 will be reset for another delay interval.

Thus, as seen from the FIGS. 1(a) through FIG. 1(d), each time the current in the circuit exceeds a predetermined design current the solid state switch 16 opens for a predetermined time period, thus instantaneously disrupting the flow of the over-current, but automatically resetting at the end of the predetermined time delay.

Additionally, the circuit 10 also includes an over-voltage trip signal detector 34. Thus, upon detection of an over-voltage condition across the line 12, 12' the over-voltage detector 34 automatically triggers the control circuit 22 to shut off the solid state switch 16 as described previously, until the over-voltage condition has subsided, thus preventing any over-voltage from reaching the protected line. The measurement of the over-voltage may be done by the over-voltage detector 34 by measuring across the line 12, 12' as indicated at 35, 36 or alternative may be installed across the switch 16 via 35, 37 to measure the over-voltage when the switch 16 is open. In the latter form, over-voltage protection can be provided in a single series element device, without reference to line 12' 14' or ground.

The series resistor 18 may also be a resistor network, or may be programmable such that different taps may be used to set the limiting current value of the circuit. Alternatively, the control circuit's trip signal voltage threshold at 24 may be modified to set the limiting current. In a digital device, this may be done via software controlling the trip voltage threshold, thus allowing for programmability of the circuit in the form of nonvolatile memory, even after the hardware has been built.

The series resistor 18 may be eliminated by monitoring the voltage across the solid state silicon switch 16. When the triac is used for switch 16, a small voltage drop, on the order of 0.7 V is present across the switch. This voltage drop will ramp upwardly in a linear manner as current through the triac increases. This increase, when converted to digital format, may be used to trigger the control circuit 22.

In the above example, the programming may be done at factory to meet the current needs, or the units may be field programmed, thus allowing maximum flexibility to the user of the device.

Unlike the prior art fuses and circuit breakers, which operate on thermal or magnetic principles, the auto-reset circuit breaker operates at an electronic speed which far exceeds any thermal or magnetic breaker. Thus, there is never any heat generated in the protected circuit, due to any over-current, since the solid state switch 16 opens instantaneously thus avoiding any form of heat buildup in any components of the protected electrical circuit.

Figure 2:
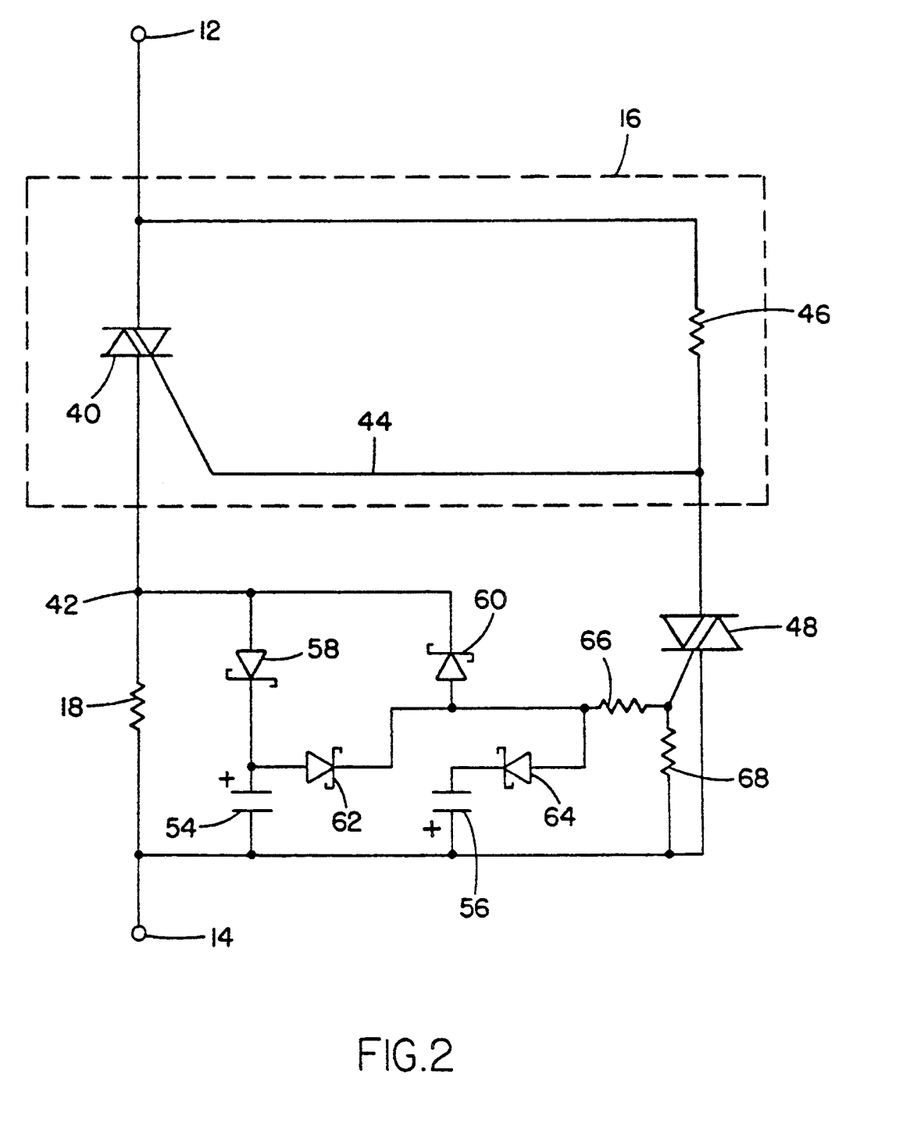
FIG. 2 illustrates the circuit of the present invention when rendered in analog form with conventional components.

FIG. 1 has been used to illustrate the present invention at the conceptual level and as a digital device. FIG. 2 illustrates the present invention in an analog circuit using a minimum number of components.

As illustrated in FIG. 2, the present invention is series connected in an AC line 12,14 to be protected. Triac 40 forms the solid state switch 16 illustrated in FIG. 1. While a triac is normally open, the switch 16 is closed in an AC environment by a bias resistor 46 which feeds the gate, as indicated at 44, to turn the triac on at the beginning of each half-cycle of AC current. The triac 40 is turned off, or opened by a second triac 48 which shorts the gate of triac 40 to the line at 14. The first control signal discussed previously is the absence of a gate voltage for triac 40, which would otherwise be available from resistor 46. Triac 48 is responsive to the trip signal discussed previously to disable triac 40, and thus open the switch 16. When the gate 44 is shorted, the triac 40 will remain on for the remainder of the AC half-cycle, but will be prevented from firing or closing during the next half-cycle.

The over-current condition is detected by measuring the voltage drop across series resistor 18. Depending on the AC half-cycle and the polarity of this voltage at 42, either diode 58 or diode 60 will conduct and charge the its associated intergrating capacitor 54 or 56 respectively. Capacitors 54, 56 thereby form a first means for measuring the voltage drop across the series resistor 18, with the voltage drop proportional to the current in the protective line 12, 14. A trip signal is generated when the intergrated voltage present in either capacitor 54 or 56 is sufficient to forward bias its associated schottky diode 62 or 64, and trigger the triac 48. The trip signal or trigger voltage is a predetermined value which is the sum of the gate turn on voltage for triac 48 and the breakover voltage for the schottky diode 62, 64. Schottky diodes are preferred for this application since they provide a low forward voltage drop which renders the trigger circuit more sensitive. Thus, a smaller resistor value may be used for resistor 18. In a typical 100 V AC line environment, protected for 20 amperes, the resistor 18 would be 0.055 ohms and would generate a voltage drop of 1.1 V when 20 amperes is reached. The gate turn on voltage for the triac is 0.7 V, and the breakover or trigger voltage for schottky diode 62, 64 would be 0.4 V. The combined voltage forms a trip signal for the circuit and is predetermined by the appropriate selection the component values for resistor 18 and diodes 62, 64.

A delay means, responsive to the value of the trip signal is provided by the time constant of the decay of capacitors 54, 56 through resistor 66. The delay period is proportional to the value of the trip signal voltage in capacitors 54, 56 which is in turn proportional to the value of the surge current passing through resistor 18. Thus, if the surge current was such that the off delay capacitors were sufficiently charged to keep control triac 48 on for several subsequent cycles, the triac 40 (switch 16) will remain off for that time period, preventing any flow of current to the equipment or protected line, except that which passes through resistor 46.

As the voltage across the off delay capacitors 54, 56 decays, below the gate trigger voltage for control triac 48, the second triac means 48 is disabled and triac 40 is again permitted to turn on through the bias resistor 46. If the current at this time should be again greater than the preset limit, the above described events will be repeated until the current in the protected circuit falls below the nominal value preselected for that particular circuit application.

Intrinsic to the foregoing operation is a zero crossing turn on or turn off mechanism. The term zero crossing refers to the AC line voltage crossing zero on conductor 12, 14. A typical triac, once turned on, will remain on until the current in the circuit drops to below the triac holding current. This constitutes the zero crossing turn off. At each zero crossing, if the control triac 48 is on, it will be latched on for the entire half of that cycle until the current goes to zero again, at which point only if the control triac 48 is not gated on, will the triac 40 be permitted to turn on, thus providing a much desired feature, a zero crossing turn on. This is particularly desirable for use in any AC inductive circuit, such as AC transformers, relays, motors or the like.

The circuit illustrated in FIG. 2, is particularly useful in an AC environment. It may be adapted for a DC environment by replacing triac 40 with a gate turn off triac. A normal triac remains conductive, once turned on regardless of the gate voltage, until the current in the circuit drops below the holding current of the triac. Thus a normal triac cannot be used as a switch in a DC environment, since it would stay on after the device has been triggered on. However, a GTO-triac will cease to conduct at the instant the gate control voltage is removed or shorted out. Thus, the circuit of FIG. 2, when equipped with a GTO-triac in lieu of triac 40, may be used in a DC environment. By using a GTO-triac, one loses the zero crossing turn off for an AC environment, but gains the ability to use the circuit in an AC, DC or AC-DC line environment.

It should also be noted that the voltage drop for the trip signal could also be measured by measuring the voltage drop across the triac 40 in lieu of resistor 18. The voltage drop across the switch would be proportional to the amount of current flowing through the protected circuit. As indicated in FIG. 1, this may be monitored by an analog to digital converter and comparator to compare the instantaneous digital reading to a preset digital setting. Should the instantaneous reading exceed the preset limit, then the control triac 48 would be turned on as described previously, which will in turn short the gate of triac 40 and turn switch 16 off for the required time delay.

Figure 3:
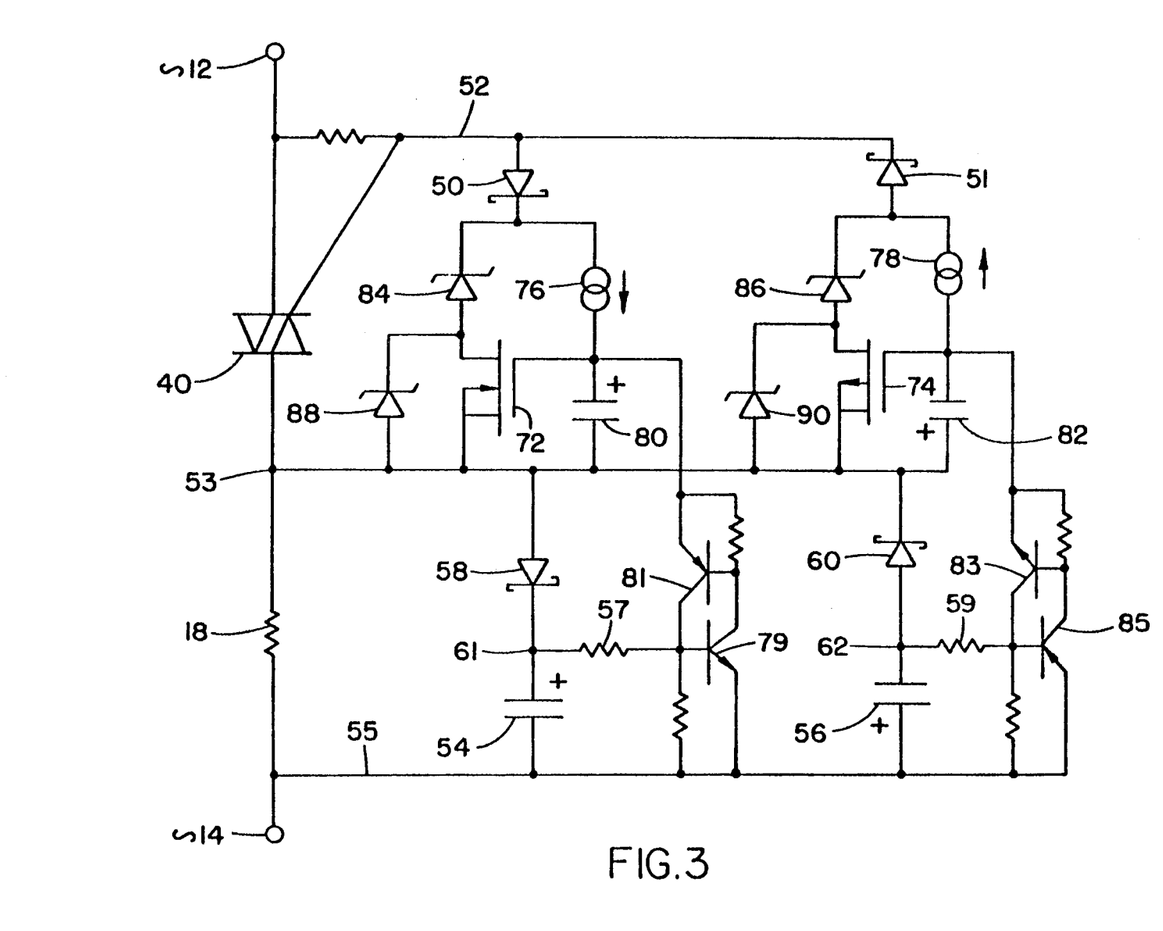
FIG. 3 illustrates an improved embodiment of the present invention adding a gate amplified circuit.

FIG. 3 is a more elaborate version of the circuit of FIG. 2, wherein the gate trigger resistor 46 is replaced with a pair of FETs which provide a full maximum gate trigger current for the triac 40. The gate trigger resistor 46 illustrated in FIG. 2, must deliver sufficient gate current to enable the triac 40 in the normal operational mode, and yet be able to handle all of the voltage imposed across it when the triac 40 is in the open state due to an overload condition. This requires that the gate trigger resistor 46 be low in value for the sake of delivering sufficient gate trigger current, and also have a high voltage and power rating in order to handle all of the power across it, when the control triac 48 has been turned on, and triac 40 has been turned off. This results in a heavy and bulky resistor which may be avoided by the use of FETs 72 and 74 as illustrated in the gate amplified circuit of FIG. 3.

As illustrated in FIG. 3, the gate turn on resistor 44 is replaced by a pair of constant current devices 76, 78 and matching FETs 72, 74 which provide a gate trigger current for the triac 40.

When 53 is negative, FET 72 is turned on by a voltage across capacitor 80. Once conductive, FET 72 establishes the gate turn on current for triac 40 at 52 through the zener diode 84 and schottky diode 50. When 14, 53 goes positive, FET 74 is turned on by the voltage across capacitor 82. Once conductive, FET 74 establishes the gate turn on current for triac 40 through zener diode 86 and schottky diode 51.

The current carried by the switch, and the voltage drop across resistor 18 is measured by intergrating capacitors 54, 56 which are charged in their respective polarities by schottky diodes 58, 60.

When an over-current condition is encountered, the trip voltage at 61 or 62 (depending on the line polarity) will render the latching transistor pair 79, 81 or 83, 85 conductive. Alternately, an SCR may be used in lieu of 79, 81 with a second SCR replacing pair 83, 85. As illustrated, the latching transistor pairs are regenerative and once triggered, remain latched as long as the trigger voltage is present on capacitors 54, 56.

When the trip voltage is reached at 61, transistor 79 is rendered conductive which renders transistor 81 conductive to short the capacitor 80 to ground and prevent the constant current device 76 from turning FET 72 on. With FET 72 off, there is no gate current at 52 to turn on triac 40. As long as the transistor pair 79, 81 remain latched, any current through the constant current device will be shorted through transistor 80 to line 55.

The transistor pair 79, 81 will remain latched until the voltage stored on capacitor 54 is discharged by resistor 57 to rail 55. The operation of capacitor 56, transistor pair 83, 85, capacitor 82 and constant current device 78 is identical, but operable in the opposite half-cycle when 53 goes negative.

When the transistor pairs 79, 81 and 83, 85 are unlatched, then the appropriate FET, 72 or 74, will close the triac 40 on the next zero crossing. If the over-current condition still exists, then the trigger and delay cycle is repeated.

The delay means of FIG. 3 includes both of the capacitor pairs, including capacitors 54, 80 for one polarity and capacitors 56, 82 for the other polarity. The capacitor pair 54, being discharged through resistor 57 and transistor pair 79, 81 and capacitor pair 56, 81 being discharged through resistor 59 and capacitor pair 83, 85.

Zener diodes 84, 86 provide a small voltage stand off to enable the transistor pairs to latch during over-current conditions before the triac 40 can be triggered. Zener diodes 88, 90 provide over-voltage protection for the FETs 72 and 74.

Figure 4:
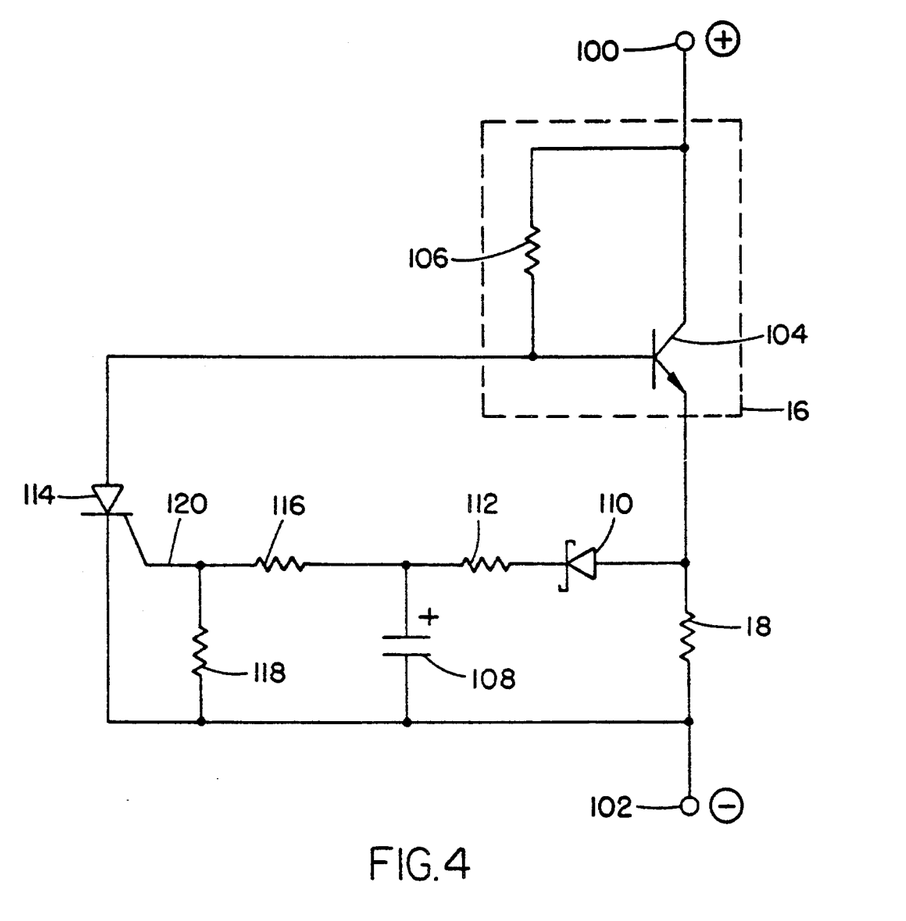
FIG. 4 illustrates an embodiment of the present invention particularly adapted for use in a DC environment.

FIG. 4 illustrates an auto-reset circuit breaker particularly adapted for use in a DC circuit as a two element device. The phrase two element means that the device works off the line power while being in series (2 terminal arrangement) with the circuit. As a DC device, the circuit of FIG. 4 needs to be properly polarized when connected to the DC circuit. Terminal 100 is the positive end of the device and is connected to the positive end of the line to be protected, while terminal 102 is the negative terminal of the device and is connected to the negative end of the line to be protected.

Transistor 104 is used as the solid state switch 16 of this circuit. During normal use, transistor 104 is biased to a conductive state by means of the voltage differential across a gate turn-on resistor 106.

Resistor 18 is used to monitor the current flow and generate the trip voltage in the circuit in the event of a current surge. The trip voltage for the circuit of FIG. 4 being the sum of the forward biasing voltage for schottky diode 110 and the gate turn-on voltage for SCR 114. Capacitor 108 integrates or "measures" the voltage drop across the resistor 18, and when an over-current condition occurs, the voltage drop across resistor 18 triggers the SCR 114. When the SCR 114 is triggered, or turned on, the gate turn-on current developed by resistor 106 will be shorted to the line 102, and transistor 104 will cease to conduct.

Since there is no holding or latching current for SCR 114, the transistor 104 will be held open only for the period of time that the gate trigger current at 120 exceeds the gate trigger current developed by resistor 116. This condition is determined by the time delay capacitor 108 and resistor 116. The delay interval exists until capacitor 108 is discharged below the trip voltage level determined by SCR 120. At this point the SCR ceases to conduct, and gate turn-resistor 106 biases again, the transistor 104 to a conductive state.

If the over-current condition continues to exist, the voltage drop across resistor 18 will recharge capacitor 108 to develop the trip signal for the control SCR 114. The first control signal then shunts the gate current for transistor 104, thereby opening the circuit and protecting the line 100, 102 from the over-current condition. This novel reset feature will continue to be repeated at the delay interval determined by capacitor 108 and resistor 116 and capacitor 108 until the over-current condition subsides.

Figure 5:
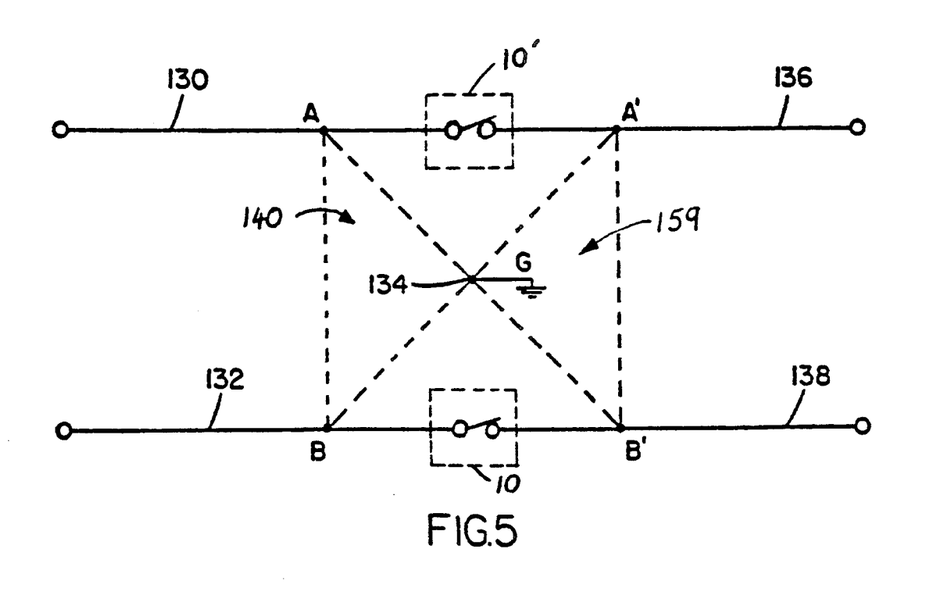
FIG. 5 is a symbolic block diagram typifying the present invention adapted for use in a pyramid protector.

FIG. 5 typifies by illustration only (not a schematic) a new kind of lightning and over-current, over-voltage protector applicable to multiple line circuits. Applicant has termed this device a "Pyramid Protector". FIG. 5 is a diagramatic illustration of a two line pyramid protector. All two line circuits, and particularly those in the telecommunication and computer industry are subject to lightning surges and strikes. Lightning spikes and surges are particularly harmful to the electronics associated with these industries, and the pyramid protector is particularly useful as a point of entry protection device at both the network level and the individual equipment level.

FIG. 5 is a symbolic block diagram showing one or more stages of protection along the latices and diagonal of the square A, A', B', B and G. The ABG component represents the primary three electrodes surge protector of the present invention. When the ABG component is activated, it will produce a short along the line A, B and G. Any voltage, AB, AG, or BG in either polarity in excess of the break down voltage of the device will cause the primary protector to go into full conduction and produce a virtual short along the lines AB, AG and BG. Similarly, the A'B'G component represents the secondary protector. Any surge voltage along the lines A'B', A'G and B'G in either polarity will be restricted to a permissible level as set by the device parameter.

The AA' and BB' components are normally closed connections as produced by a relay contact, a solid state switch, etc. As in the case of the no-blow fuse 10. The closed position of AA' and BB' is altered and opened, in the case of over current or over voltage. The principle of over current is the same as in any fuse or circuit breaker with the exception being that this is a solid state auto resetting line powered apparatus. Thus, the present invention is capable of self resetting. As soon as the over voltage condition is removed, or after a delay proportional to the over current, the circuit is restored to its "normally-on" condition, i.e., the AA' portion and the BB' portion are on. The over voltage and over current protection is provided in the latices of AA'G and BB'G as illustrated in FIG. 5. Thus, as illustrated in FIG. 5, the present invention provides protection along all of the portions of the square AA'B'B and along the diagonal AG, GB', BG and GA'.

Figure 6:
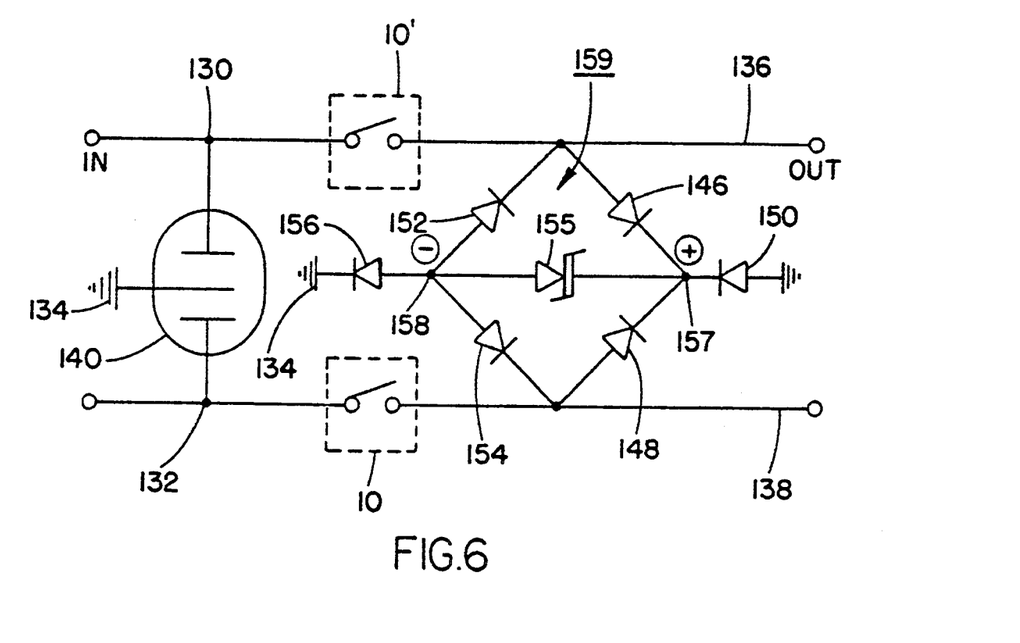
FIG. 6 is a schematic illustration of the present invention when used in the pyramid protector illustrated in FIG. 5.

The AA' and BB' portions represent the normally closed path of the device 10 and 10' as illustrated in FIG. 6. The dotted lines of the triangle ABG represent the normally open surge protector 140 as illustrated in FIG. 6. The dotted lines of the triangle A'B'G represent the normally open path of the secondary protector 159 as illustrated in FIG. 6. The sides AA', A'B', B'B, AB, AG, A'G, B'G and BG (the latices) of the pyramid AA'B'BG each represents a path along which over current and/or over voltage protection is provided to the equipment to be connected across the terminals 136, 138 of the device from the input 132, 134.

Each line is equipped with a line to line and line to ground primary lightning protector for shunting overvoltage surges with a high energy content. As illustrated in the block diagram of FIG. 5, a primary gas tube or similar type of surge arrester is mounted across the line from A to B and Ground, providing primary lightning protection between 130, 132 and 134. This is illustrated by the triangle A-B-G in the base of the pyramid in FIG. 5.

The output of the pyramid protector is connected across A', B' and ground and is normally a secondary three element transient voltage suppressor protecting the equipment side of the protector. This is represented by the triangle formed by A', B' and G.

Figure 9:
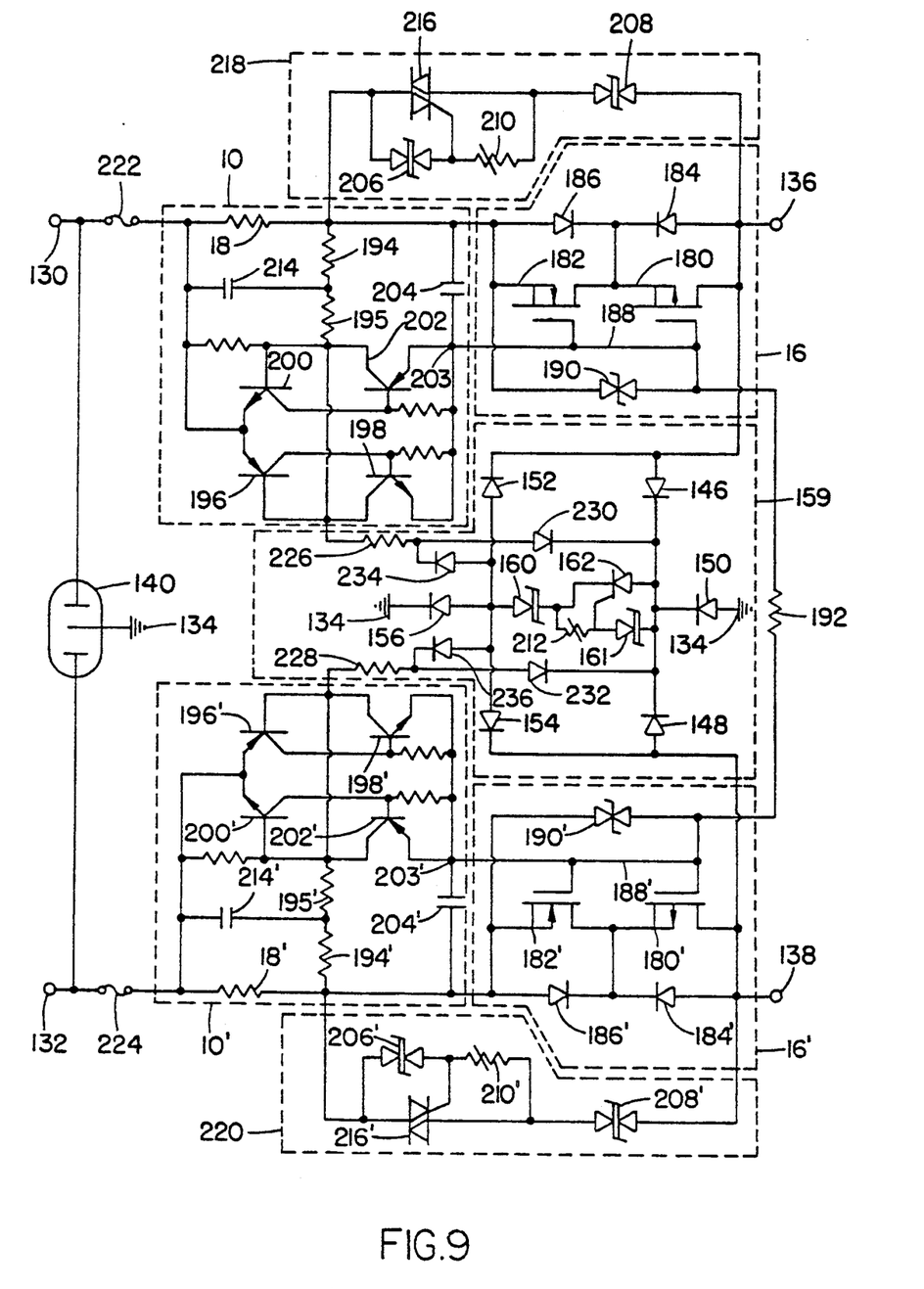
FIG. 9 is a schematic illustration of the preferred embodiment the present invention, particularly adapted for use in the pyramid protector as an AC-DC circuit.

The inputs are connected to the outputs with two AC/DC auto reset circuits as will be hereafter described with respect to FIG. 9. The pair of auto reset breakers A-A' and B-B', connect the primary protector to the secondary protector. Each auto reset breaker has dual mode of operation. Both over-current between 130-136 and/or 132-138 respectively, or over-voltage from line to line in each leg 130-136 and/or 132-138 and/or 130-132 and/or 136-138 and/or 136-138 and/or 138-134 from line to ground will open the auto-reset breaker. This separates the primary protector from the secondary protector, and the primary protector is then permitted to see the entire incoming surge voltage without being impeded by the clamping of the secondary transient voltage suppressor.

Thus, the secondary protector always remains across the output of the protector and the input of the equipment it protects. The series connected auto-reset circuit breakers continue to isolate the input from the output, as long as over-current and/or over-voltage condition exists. The primary protector in the example may be compared to a work-horse due to its ability to handle large energy surges. The secondary protector is analogous to a race-horse, since its speed enables it to handle very fast incoming surges.

Thus, as seen from FIG. 5, over-voltage/over-current protection is provided along each side of the pyramid, hence the name pyramid protector.

The circuit diagram of FIG. 6 is a schematic illustration of the block diagram of FIG. 5.

A three element gas tube arrester 140 connects across the incoming lines 130, 132 and ground 134.

Auto-reset AC/DC circuit breakers 10 and 10' connect across 130, 136 and 132, 138 respectively. They remain in a normally closed position until an over-current or over-voltage condition is detected.

Diodes 146 thru 156 form a secondary protector 159 which uses a three phase bridge rectifier requiring only one transient voltage suppressor 155 to be across the positive 157, and negative 158 ends, of the bridge. This novel arrangement maintains a true 3 pole, three element gas tube, like characteristics wherein all voltages line to line or line to ground are kept to the same potential, as determined by the transient voltage suppressor 155. This ensures that the voltage across the output, i.e., to the equipment, never exceeds the prescribed limit. The use of the bridge rectifier also reduces the number of transient suppressors normally required for line to line and line to ground protection, thus providing a more economical circuit for the same level of protection.

Figure 6A:
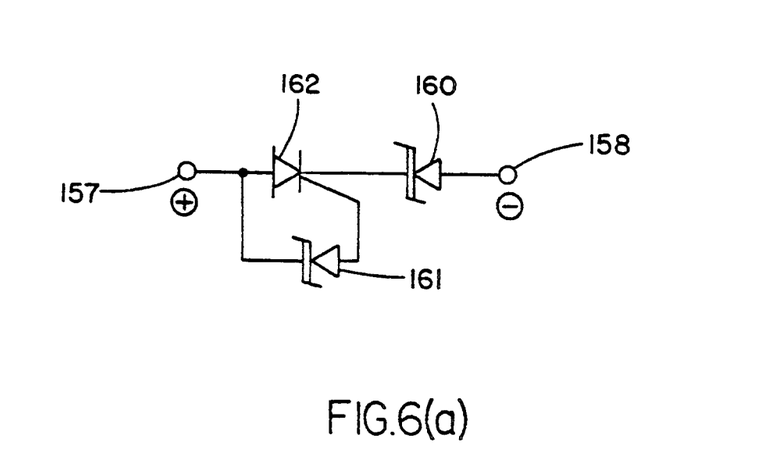
FIG. 6(a) is a schematic illustration of an alternative form of transient voltage protection for the circuit illustrated in FIG. 6.

FIG. 6(a) illustrates an alternate form of transient voltage suppressor that may be installed in the circuit illustrated in FIG. 6 in lieu of the transient suppressor 155. This improvement enables the transient suppressor network to function at sub-nano second speed characteristic of a Zener diode, with the power handling capability of an SCR. Low voltage, high power Zener diodes are readily available, and high voltage, low power Zener diodes are readily available but high voltage, high power Zener diodes are very expensive. The circuit of FIG. 6(a) combines a high voltage low power Zener 159 and a low voltage high power Zener 160 in series to achieve a fast response time in the sub-nano second range. The SCR 162 is switched in after a voltage spike is encountered to protect Zener 159 from a high energy load, and to fold back the break-over voltage of the combined circuit to prevent a runaway condition. When a single Zener encounters a high voltage spike, the spike is not always limited to the Zener voltage, since the voltage will continue to ramp up as the current dissipated by the Zener increases. The fold back feature of FIG. 6(a) prevents this runaway condition.

As illustrated in FIG. 6(a), Zener 161 breaks over at a first transient voltage TS1, which may be 300 volts. Zener diode 160 breaks as a second transient voltage TS2, which may be 60 volts. When a transient voltage spike is encountered, the Zener 159 and 160 will break-over in series in the sub-nano second speed range. The SCR 162 has a characteristic delay of 1 to 3 s before turning on. Zener 159 is able to conduct the voltage and energy for the short 1 to 3 s duration, even though it might not be able to handle the entire duration of the spike. After the SCR 162 fires, the voltage protection will fold back to the 60 volt level set by Zener 160.

Figure 7:
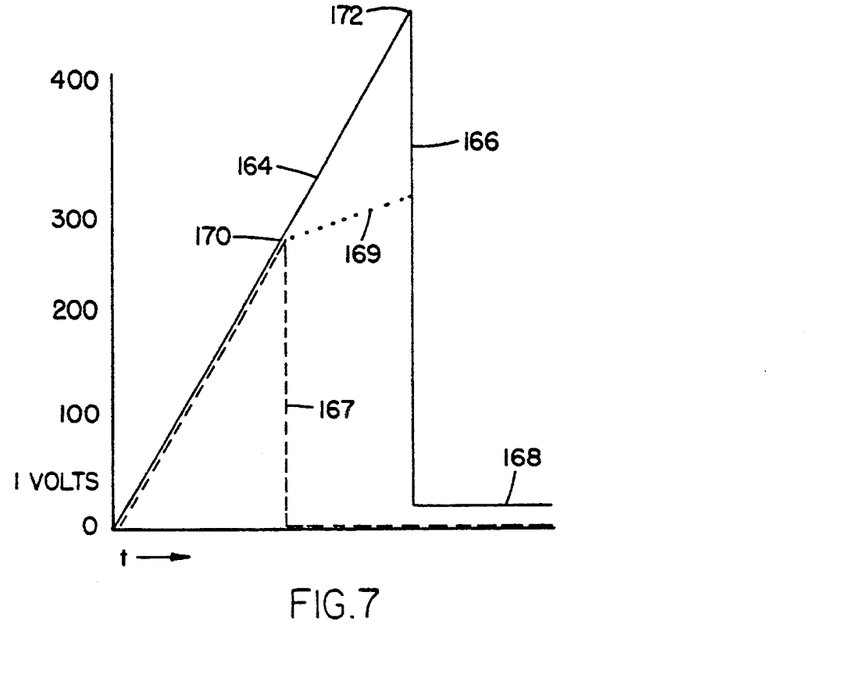
FIG. 7 is a illustrating the response of conventional devices and the pyramid protector to an over-voltage condition.

FIG. 7 illustrates in graphic form, the action of the pyramid protector on an incoming voltage surge, wherein voltage is the Y-axis, and time is the X axis. In the absence of any protection, the incoming voltage would continue to rise along line 164 until the gas tube 140 fires. As the gas tube 140 fires at 172, the incoming voltage will drop along the line 166 to a safe voltage corresponding to the line 168 and remains there until the surge condition has passed away. The time it takes for the gas tube 140 to fire can often be sufficient to blow the microelectronic or integrated circuits in most sensitive telecommunications or computer equipment. This time period of untamed surge voltage is reduced by the use of a secondary protector as formed by the six rectifying diodes 146 thru 154 and the transient suppressor 155, or the substitute therefore as shown in FIG. 6b.

When the incoming voltage rises to the transient suppressor breakover voltage 170, the transient suppressor begins to conduct heavily, which causes the auto-reset circuit breaker to open the circuit between the input and the output thus releaving the secondary protector 155, as well as the related equipment across the output, from any sustained over-voltage or current. As illustrated in FIG. 7, as the voltage continues to rise beyond 170, the excess voltage across the input lines 130, 132 or line to ground 134, will maintain the auto-reset circuit breaker of the pyramid protector in the open state until the gas tube fires at 172 and the voltage across the input drops to the level shown by 168. The voltage across the output of the pyramid protector is illustrated with the dotted line 167, which drops to zero as soon as the transient voltage suppressor 155 begins to conduct. The output of a conventional device, having only a gas tube primary and a transient secondary is illustrated by the dotted line 169. When only a transient voltage suppressor is available, the voltage rise will initially stop, but will then begin to rise in a runaway condition as the current drained by the suppressor increases.

Figure 8:
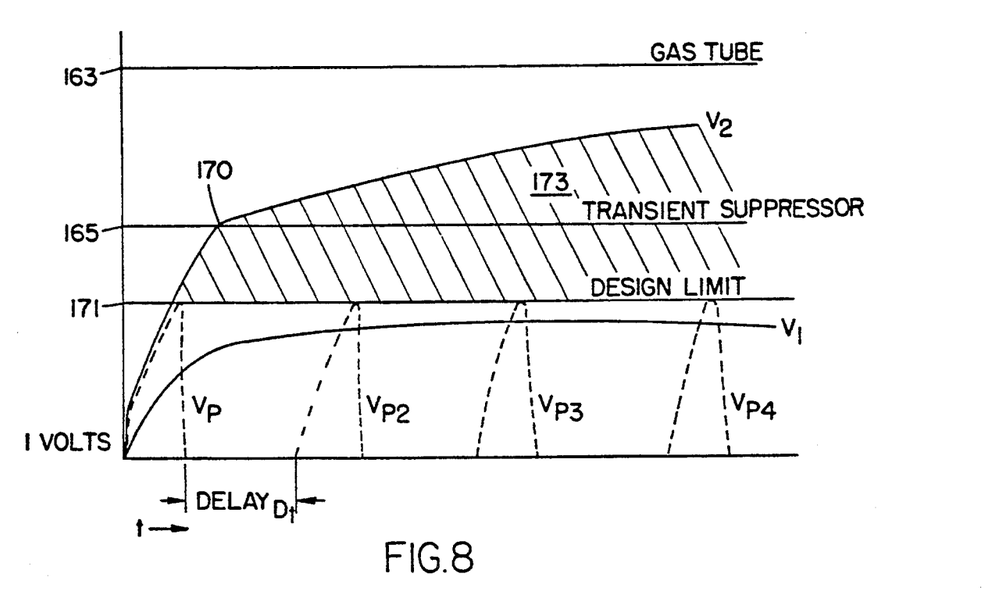
FIG. 8 is an illustration of improvement offered by the present invention with respect to "gray area" voltage and current conditions.

FIG. 8 illustrates an additional level of protection provided by the pyramid protector in the "gray zone" that exists below the firing point of the primary gas tube. A conventional gas tube and transient protection device is particularly vulnerable to an over-voltage over-current condition that may exist above the intended operating voltage, but below the gas tube firing voltage.

FIG. 8 illustrates a typical gas tube voltage of approximately 450 volts at 163, and a typical transient suppressor level of 220 volts at 165. A typical design limit for a telecommunication environment of 100 milliamp at nominal voltage is indicated at 171. DC voltage curves have been used in FIG. 8 for simplicity of illustration, although, same principles apply to an AC voltage, or a combined AC/DC voltage environment. When a voltage/current within the design limit $V_1$ is encountered, the voltage is handled normally and the output passes the full voltage/current to the protected equipment.

When an over-voltage $V_2$ is encountered without the present invention, the voltage rises until it reaches the transient suppressor breakover voltage as indicated at 170. At that point the voltage/current is conducted to ground, but the voltage continues to ramp up as the current to ground increases. If the gas tube voltage is not reached, both the transient suppressor and the protected equipment will "cook" in the gray area 173 of FIG. 8, until the condition is removed, or until an element fails from the overload.

In contrast, the pyramid protector cuts the voltage as indicated at $V_p$ as soon as the voltage/current exceeds the design limit. The breakover point in FIG. 7 for the pyramid protection is illustrated for an over-voltage surge without a load on the line. FIG. 8 illustrates a normal telecommunications environment with a nominal load. A delay interval $D_t$ is designed into the auto-reset circuit breaker. At the end of the delay interval, the pyramid protector will again begin to conduct as illustrated at $V_{p2}$, until the combined voltage/current is reached. This continues until with $V_{p3}, V_{p4} \ldots V_{pn}$ until the over-voltage condition is removed.

FIG. 9 is a schematic diagram of a complete pyramid protector as described in the circuit diagram of FIG. 6 with the auto-reset circuit breakers defined in detail. FIG. 9 therefore represents two AC/DC auto-reset circuit breaker elements 10 and 10' and the solid state secondary protector 159 of FIG. 6 in a combined device suitable for IC fabrication.

Illustrated in FIG. 9 are the inputs to the pyramid protector 130 and 132 which connect to the two incoming lines of a telecommunications circuit or two lines from an AC Power Source.

Lines 136 and 138 constitute the output of the above two lines exiting from the pyramid protector to the load being protected.

Connected in series between the inputs 130 and 132, and the outputs 136 and 138 respectively, are conventional fuses 222 and 224. Bridged across the outputs 136, 138 is also connected a three element solid state secondary protector 159 which responds at electronic speed and has the fold-back characteristics of an conventional gas tube or similar spark-gap arrester.

The solid state protector not only monitors the voltage across the output lines 136, 138 and ground 136, but also senses the incoming voltage across the input lines 130 and 132 with respect to each other and with respect to ground via the resistors 226 and 228. The auto reset circuit breakers 10 and 10' consist of series resistors 18 and 18' and solid state switches 16 and 16' respectively.

Resistor 192 connects across the two solid state switches 16 and 16' keeping them normally ON or closed. Also connected across the inputs and the outputs of the solid state switches 16 and 16' are solid state over-voltage protectors 218 and 220 respectively. Upon seeing over-voltage across the solid state switches 16 and 16' these go into heavy conduction. In the present illustration a bilateral over-voltage protector with fold back characteristics is illustrated.

Under over-voltage conditions the Gas-tube 140 will operate and put a short across the lines 130 and 132 to ground 136. However, during the characteristic ionization time required by the gas-tube 140, the entire incoming voltage is passed on to the output 136, 138 in the absence of the auto-reset circuit breakers 10 and 10'.

The incoming voltage is then clamped at the output to the restricted level as allowed by the secondary protector at a sub-nano second electronic speed. Simultaneously the auto-reset circuit breakers 10 and 10' are triggered by this over-voltage condition via the aforementioned resistors 226 and 228 and open the normally closed switches 16 and 16' respectively. In the absence of the resistors 226 and 228, the secondary protector 159 would clamp the over-voltage and generate an over-current through the series resistor 18 and 18' which would consequently also open the normally closed solid state switches 16 and 16' respectively.

The opening of the solid state switches achieves two purposes, first it isolates the load across 136–138 from the potentially damaging over-voltage condition at the input, and secondly it permits the incoming voltage to rise freely so that it may allow the primary protector 140 to operate and shunt all the damaging surge potential to ground.

In the over-current mode, which may be due to the over-voltage being passed on to the secondary protector or a short or overload being placed across the line 136, 138 with nominal voltage across the line, the circuit performs the conventional function of the over-current protector. Should the current exceed the design limit of the device a trip voltage generated across the series resistors 18 and 18' will trigger a control circuit to open the normally closed switches 16, 16'. This interrupts the path of the over-current through the device.

The resistors 194, 194' and the capacitors 214 and 214' form an ON-delay function for tailoring the time permitted for the over-current to flow through the circuit before the auto-reset circuit breaker interrupts the flow of over-current.

Similarly, the resistors 195 and 195' and the capacitors 214 and 214' form an off-delay function for tailoring the delay interval of the auto-reset function of the circuit.

The gate capacitors 204, 204' and the inter-connecting feed resistor 192 define an additional delay interval for the circuit before it automatically resets the switches 16, 16'.

In the case of sustained over-voltage where the primary protector 140 breakdown voltage is not reached, but the over-voltage exceeds that of the secondary protector 159, the auto-reset circuit breaker will remain in the open state. However, by design the voltage now will be distributed across the pass element protectors 218 and 220 and across the secondary protector 159. In the rare event where a current through the above is sustained to a catastrophic level the conventional fuses 222 and 226 respectively will open, thus preventing permanent damage to the devices or the load. These conventional fuse elements 222 and 226 may then be replaced.

The circuit of FIG. 9 is bilateral in both legs 130, 136 and 132, 138. The service or input can be either positive or negative, providing ac, dc or ac/dc capability.

Switches 16, 16' are formed with pairs of complimentary FET's 180, 182 and 180', 182'. The FET's are biased on by a voltage divider network extending across the legs of the pyramid protector, said divider including (from terminal 130) resistor 18, Zener 190, resistor 192, Zener 190' and resistor 18' (to terminal 132).

When line 130 is positive and line 132 is negative, the gate 188 of the FET switches 180, 182' will be negative with respect to line 130 by virtue of the voltage applied across voltage divider network. This negative voltage at gate 188, turns on P-FET 180, which establishes a path for a flow of current from line 130 through resistor 18, diode 186 and P-FET 180 to the output terminal 136. If a load is connected across 136 and 138, then the above current will flow through the load back to 138 continuing through diode 184' and FET 182' and resistor 18' to terminal 132. FET 182' will be biased "ON" due to the positive voltage applied to its gate 188' as supplied by the previously described voltage divider network.

The over-current and over-voltage monitoring circuits, include 4 pairs of latching transistors, with two pairs associated with each leg to provide bilateral capability in each leg. Transistors 196, 198 form a latching configuration when terminal 130 is positive, while transistors 200, 202 form a latching configuration when terminal 130 is negative. Likewise, transistors 196', 198' form a latching pair when terminal 132 is positive, while transistors 200', 202' form a latching pair when terminal 132 is negative.

Excess current flowing through the current measuring resistors 18 and/or 18' will generate an excess voltage drop across them which will be proportional to the product of current and resistance ($V_x = I_x R$) 18 and 18' respectively.

The voltage drop from resistor 18 is current limited by resistors 194 and 195, and integrated by capacitor 204. Likewise, either voltage drop across resistor 18' is current limited by resistors 194' and 195' and integrated by capacitor 204'. When the voltage drop across resistor 18 exceeds a predetermined level, it biases one of the latching pairs (depending on polarity) 196, 198 or 220, 202 into conduction.

Likewise, when the voltage drop across resistor 18' exceeds a predetermined level, it biases one of the latching pairs (depending on polarity) 196', 198' or 200', 202' into conduction. When the latching pairs are conductive, the junctions 203, 203' are shorted to their respective terminals 130, 132 to discharge the capacitors 204, 204' and remove the gate voltage from the FET switches, thereby rendering the FETs non-conductive and opening the primary circuit (switches 16, 16').

The auto-reset function of FIG. 9 is determined first by the r/c time constant of resistor 195 and capacitor 214 (and resistor 195' and capacitor 214'). Capacitor 214 will keep the latching pair of transistors in conduction until completely discharged by resistor 194. However, the FET switch pairs will remain off until the voltage divide network is able to recharge capacitor 204, 204' to the FET gate turn on voltage. The delay interval is then the sum of the two delay periods.

In an over-current condition, the circuit will periodically close the FET pairs to determine if the over-current condition still exists. In an over-voltage condition, the transistor pairs will be sustained in the latched condition from the bias provided by the over-voltage condition.

The other over-voltage detection feature of this circuit occurs when excess voltage is on the line, from line to line or line to ground. Even when the switches 16, 16' are OFF, the over-voltage is fed to the transient suppressors 160 and 161 of the secondary protector 159 via the resistors 226 and/or 228. The resistors 226 and 228 are very large in volume so that there is only a small amount of current that flows through the base emitter junctions of the latching transistor pairs in the appropriate polarity. Yet it is enough to keep the latch turned on even with only slight over-voltage condition, thus keeping the FET switches OFF even when there is no excess current condition, or no load connected across the output 136, 138. Diodes 230 and 234 rectify the line voltage from line 130 via resistor 226, while Diodes 232 and 236 rectify the line voltage from line 132 via resistor 228.

Thus, the latching pairs are responsive to either on over-current or on over-voltage condition to keep the FET pairs non-conductive and the switches 16, 16' open.

During the time the FET switches are open, the circuit is open, which permits the full input voltage to appear across the line 130–132, without being shunted by the circuit in any way, thus allowing the primary protector 140, or a comparable protector such as a spark gap device, to break down and shunt the entire surge current. Should the surge continue to rise, or the gas tube 140 fails to ionize, the incoming voltage will be divided across the transient suppressor network. This network includes a diode bridge 146, 148, 152 and 154 connected across the rails 130, 136 and 132, 138. The diode bridge is also connected to ground through diodes 150 and 156. The transient suppressor previously described with respect to FIG. 6 is placed across the bridge to conduct to ground in the event a voltage transient is received. A short transient, which is shorter than the "on" delay of capacitors 214, 214', will pass through the FET pairs, but will be grounded by the transient suppressor network.

The output voltage is also protected by the bridge circuit protecting the output from over-voltage across line to line 136–138, line to ground 134–136 and 138–134' and in either polarity. Should the over-voltage condition continue to exist, the triacs 216 and 216' and the SCR 162 will fire to reduce the voltage across 130–136, 132–138, 136–138 and 136-Gnd and 138-Gnd in both polarities. Conventional fuses 222 and 224 will blow only in the event the primary protector fails to respond, and the surge condition is of a sustained nature.

A pair of pass elements 218, 220 are connected in parallel with the FET pairs to provide over-voltage protection for the FETs.

At a given current level the resistors 210, 210' will permit the triacs 216 and 216' to trigger. Similarly, resistor 212 will set the trigger of the SCR 162. The triacs 216 and 216' bypass the transient suppressors 206 and 206' respectively, while SCR 162 bypasses the transient suppressor Since the transient suppressors 206, 206' and 158 act as trigger devices and are bypassed by the power silicon devices 216, 216' and 162 respectively, they may be of lower power rating than the series elements 208, 208' and 160 respectively.

The solid state pass elements 218 and 220 formed by the transient suppressors 206, 208 in conjunction with the foldback arrangement denoted by 216 and 210, and similarly by 206', 208' and 216' and 210' respectively may be replaced by:

a) a four layer bilateral foldback device as commonly available from several manufacturers such as Lucas of England, SGS of Italy and Motorola and GE of USA.
  b) Alternatively by a unilateral device within a high current high voltage rectifying bridge similar to the secondary protector 159, illustrated in FIG. 6.

The solid state over-voltage protectors 218 and 220 protect the FET switch pairs from over-voltages during the time the switches 16, and 16' are open due to over-voltage and/or over-current, while permitting the maximum required firing voltage to be available for the primary arrester 140.

While FIG. 9 has been illustrated with the primary protection 140 across the "input" side 130, 132 and the secondary protector 159 across the "output" side 136, 138, it should be noted this may be rewarded for certain applications. For example, in the telecommunications industry, the order would be reversed when the device is installed at a telephone C.O., but would be used as illustrated when installed at a subscriber location.

While the embodiment illustrated in FIG. 9 is illustrated for an active Line, it should be understood the device could be modified for use on dry data communication circuits which normally do not have a talk battery or other voltage source impressed thereon. In these "dry" circuits, resistor 192 could be replaced with a Lithium battery to maintain the switches 16, 16' in an "ON" condition. Since the FET pains are biased on by voltage rather than current, a single battery would provide years of service life.

Figure 10:
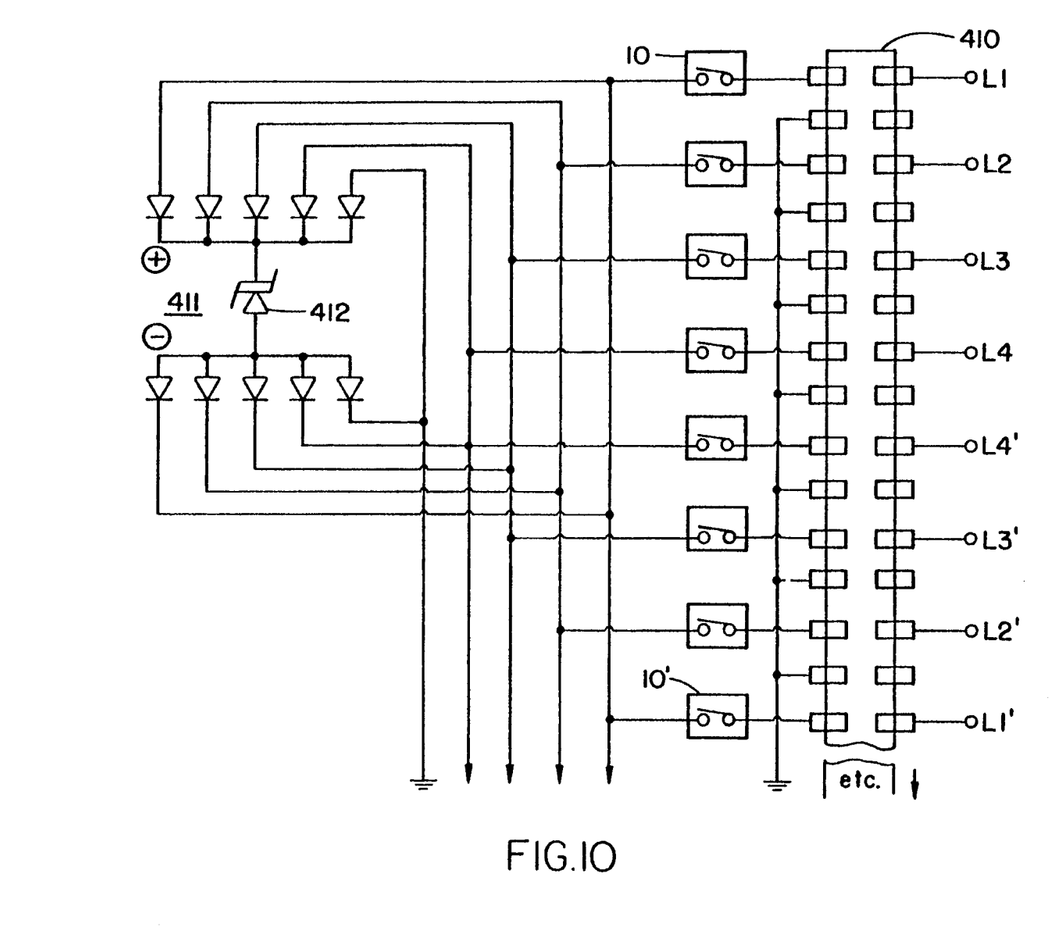
FIG. 10 is a schematic illustration of the present invention bidirectional multi-line environment using a diode bridge rectifier.

FIG. 10 is a schematic diagram which illustrates a bidirectional type of multi-line pyramid protector applicable to computer communications cables, wherein the source and the load may be on both sides of the protector, making it difficult to demarc the primary and secondary protection as is otherwise feasible in the case of telephone lines where the outside network gets the primary side and the inside wire (customer equipment) gets the secondary protector.

As seen in FIG. 10 the primary protector 410 is distributed to both sides, so that both incoming and outgoing lines enter into a multi electrode gas tube 410 with a common chamber. Each line, input or output, is connected to an electrode in the gas tube with a ground electrode always next to it.

In operation if any one of the line exhibits any excessive voltage which causes the gas tube to fire, the common chamber of the gas tube ionizes so that all of the lines are shunted to ground. Separating the inputs from the outputs between each line are two auto-reset circuit breakers. The midpoint of these is coupled to a bridge rectifying circuit 411 the output of which is connected to a secondary protector 412 which is common to all the lines.

FIG. 10 illustrates a common chamber primary protector and common (single, by virtue of bridging) single secondary protector, thus, substantially reducing costs.

The single transient suppressor 412 as shown in FIG. 10 may be replaced by the circuit arrangement described in FIG. 6(b). Alternately, in lieu of the multi-line common chamber gas tube, each line, both incoming and outgoing may be equipped with a specially designed 3 electrode gas tube wherein the first electrode goes to the line and the third electrode to ground while the secondary electrodes of all the gas tubes in the circuit are connected together to form a cascading electrode arrangement allowing all gas tubes to fire if one of them fires. This will occur since the second electrode on all of the tubes has a much lower firing voltage than the nominal firing voltage between line and ground electrodes i.e. the first and third electrode respectively.

The multi element gas tube 410 has been illustrated in FIG. 10 with 4 incoming lines L1, L2, L3 and L4; and 4 outgoing lines L1', L2', L3' and L4'. It should be noted the gas tube and bridge arrangement of FIG. 10 is not limited to 4 lines, and could be expanded as desired.

As illustrated in FIG. 10, each line is protected by a multipath primary over voltage protector from line to line across any pair of lines, and from each of the lines to ground. Likewise, the diode bridge 411 provides transient voltage protection from line to line across any pair of lines, and from any of the lines to ground. Using a pair of auto reset circuit breakers such as 10, 10' enables the circuit to be truly bidirectional, so that the primary protector receives the brunt of any incoming surge, regardless of which side it hits, with the auto-reset circuit breakers protecting transient voltage suppressor 412, regardless of the origin of the over-voltage and/or over-current.

I claim:

1. A pyramid protector providing line to line and line to ground over-voltage and over-current protection for each line to be protected, said protector comprising:
  (a) at least two conductors to be protected, and a ground conductor for dissipating over-voltage transients,
  (b) a multi-element primary protector having a discharge plate for each conductor and at least one ground plate for receiving over-voltage transients,
  (c) a current detector circuit, said circuit measuring a variable voltage drop across at least one element series mounted in said line to be protected, said current detector circuit generating a trip signal when said electrical current exceeds a predetermined level,
  (d) at least one normally open solid state silicon switch series mounted in each conductor following said primary conductor, said switches being responsive to a first control signal to close said switches for conduction therethrough,
  (e) control means for generating a first control signal in response for a voltage across the conductors to thereby close said switches to enable conduction therethrough, said control means responsive to said trip signal to shunt said first control signal to open said switch and interrupt conduction therethrough, said control means again generating said first control signal following a predetermined time interval,
  (f) a secondary transient protector means for conducting high voltage transient to ground, said secondary transient protector means mounted between each of said conductors and ground following said solid state silicon switches.

2. A pyramid protector as claimed in claim 1, wherein said primary protector is a multi-plate gas tube.

3. A pyramid protector as claimed in claim 1, wherein said protector includes a battery to enable said control means.

4. A pyramid protector as claimed in claim 1, wherein said secondary transient protector further includes a diode bridge circuit across the conductors to be protected, with the positive and negative nodes of the bridge circuit being connected to ground by first and second diodes, said positive and negative nodes being series connected by a high speed transient voltage suppressor.

5. A pyramid protector as claimed in claim 4, wherein said transient voltage suppressor comprises a zener diode.

6. A pyramid protector as claimed in claim 4, wherein transient voltage suppressor comprises an SCR and low voltage zener diode series mounted between the positive and negative nodes, with a gate of the SCR connected with the positive node by a second zener diode.

7. A pyramid protector as claimed in claim 1, which further comprises a over-voltage detector circuit mounted across the conductors, said detector circuit having means to enable said control means to quench said first control signal in response to an over-voltage condition between said conductors or between either conductor and ground.

8. A pyramid protector as claimed in claim 1, wherein said control means further comprises:
  (a) at least one capacitor for each conductor to integrate said first control signal(s) to predetermined levels to enable conduction therethrough,
  (b) a second solid state switch means to shunt said capacitor below said predetermined level, when said trip signal rises above a predetermined level.

9. A pyramid protector as claimed in claim 8, wherein said second solid state switches include at least one pair of latching transistors for each capacitor.

10. A pyramid protector as claimed in claim 8, wherein said solid state silicon switch comprises a pair of back to back FET's in each conductor with each FET pair having complimentary "n" channel and a "P" channel FETs.

11. A pyramid protector as claimed in claim 10, wherein said protector further comprises an over-voltage shunt means mounted in parallel with each solid state silicon switch.

12. A pyramid protector as claimed in claim 11, wherein said over-voltage shunt means comprises a triac and a zener diode series mounted in parallel with each of said pairs of FETs, with a gate of each triac conducted to its associated conductor through a zener diode.

13. A pyramid protector as claimed in claim 8, wherein said current detector includes a second pair of capacitors to integrate a voltage drop across a pair of series mounted shunt resistors, with at least one resistor and capacitor associated with each conductor.

14. A pyramid protector as claimed in claim 13, wherein said predetermined time intervals is set by an RC time constant that includes set first and said second pair of capacitors.

15. An ac-dc auto-reset circuit breaker for interrupting an electrical current in a line to be protected, when the current exceeds a predetermined value, said circuit breaker comprising;
  (a) a bilateral solid state silicon switch, series mounted in a line to be protected, said switch having a pair of complimentary (p and n) FETs arranged in series to provide bilateral conduction in response to a voltage across the line, said switch responsive to a first control signal to open said switch and interrupt the current flowing therethrough,
  (b) a first means for measuring a variable voltage drop across at least one element series mounted in said line to be protected, said first means generating a trip signal when said voltage drop and said electrical current exceed predetermined values,
  (c) a second means responsive to at least one trip signal for providing said first control signal to said solid state switch, said control signal effective to open said switch when said electrical current exceeds said predetermined value,
  (d) delay means responsive to said trip signal for enabling said second means for a predetermined delay period to hold said switch open for the duration of the delay period,
  whereby said electrical current is periodically sampled at said delay intervals until the electrical current drops below its predetermined values.

* * * * *